Patented July 17, 1951

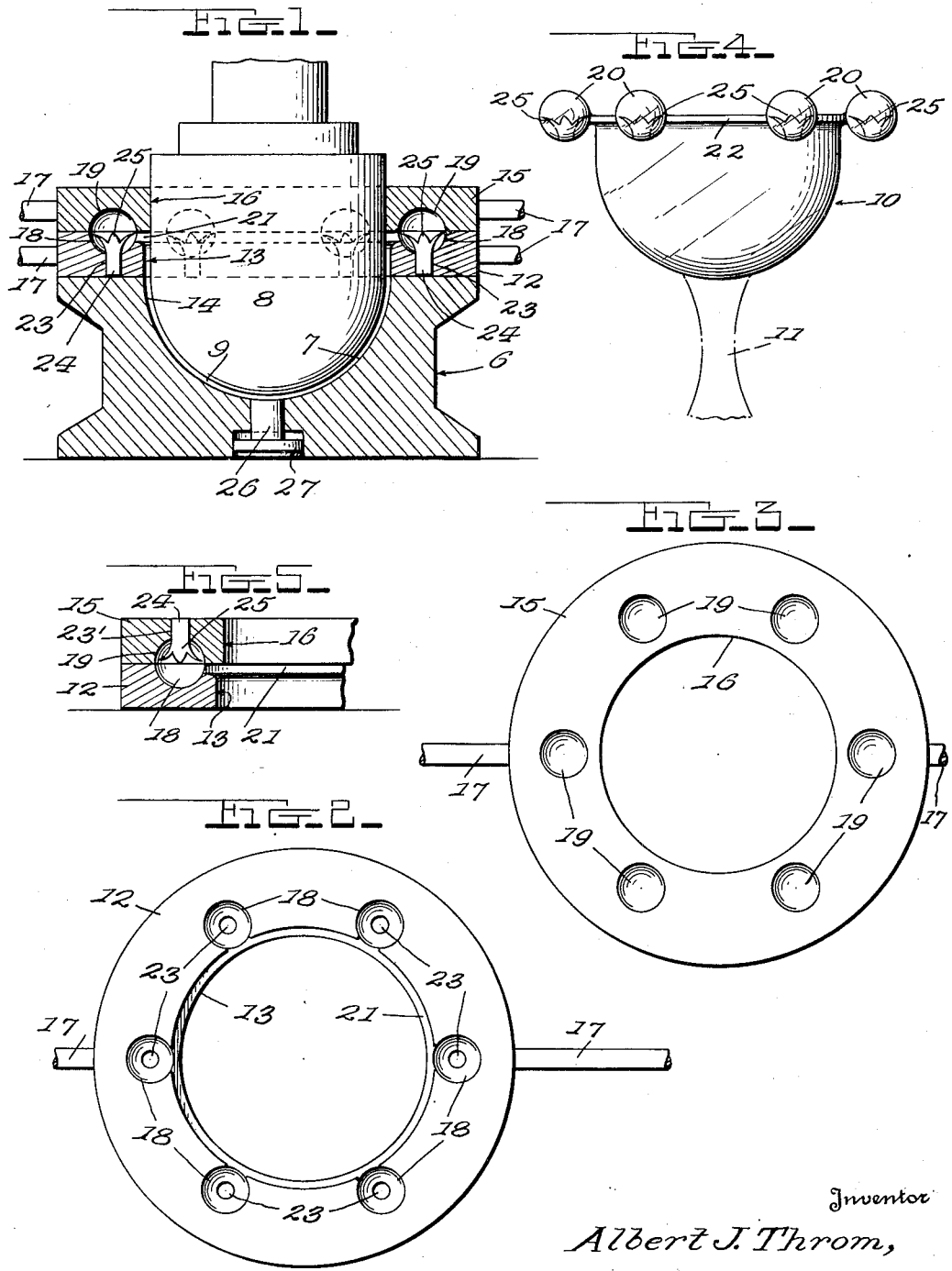

2,561,248

UNITED STATES PATENT OFFICE 2,561,248

APPARATUS FOR PRODUCING GLASS ARTICLES

Albert J. Throm, Jeannette, Pa.

Application January 18, 1950, Serial No. 139,162

2 Claims. (Cl. 49—73)

Like my companion U. S. application, Serial No. 139,161, filed January 18, 1950, the present application relates to the incorporation of preformed ornaments in moulded transparent or translucent glassware or the like, and any features common to both applications are broadly claimed in said companion application. Whereas said companion application is concerned specifically with embedding ornaments in article bases, the present invention has reference to embedding the ornaments in the rim portion of a cup-like receptacle, for example, a sherbet cup or glass, a fruit cocktail cup or glass, or an ornamental bowl, whether the article be provided with a supporting stem and foot or be merely formed with a bottom to rest directly upon a table or the like.

One object is to provide a novel, simple, and practical apparatus for use in embedding ornaments in glassware.

In the accompanying drawing:

Figure 1 is a vertical sectional view showing a mould constructed in accordance with the invention, preparatory to moulding a cup-like article having a plurality of ornaments embedded in its rim, Figure 2 is a top view of the lower section of the top ring of the mould, Figure 3 is a bottom view of the upper section of said top ring, Figure 4 is a side elevation of the article formed in the mould; and this view illustrates, by broken lines, the fact that the article may later have a supporting stem attached thereto, and Figure 5 is a detail sectional view similar to the upper left portion of Figure 1 but showing a slight modification.

While the mould construction shown will be rather specifically described, it is to be understood that the drawing is to a large extent illustrative rather than limiting, and variations may therefore be made within the scope of the invention.

A mould body 6 is shown to rest on a support, said body having a recess 7 which opens through its upper end. A plunger 8 is suitably mounted for movement into the recess 7, and when lowered, said plunger constitutes a section of the mould and cooperates with the body 6 in forming a cavity 9 in which to mould the major portion of a cup-like article 10 as shown in Figure 4. This article may later have a stem or other supporting member attached to it, as illustrated by the broken lines 11.

A ring section 12 rests upon the body 6 and has an inner edge 13 which constitutes an upward extension of the side wall 14 of the recess 9; and a second ring section 15 rests upon said ring section 12, said ring section 15 having an inner edge 16 to contact with the periphery of the plunger 8, when the latter is lowered as seen in Figure 1. Both ring sections 12 and 15 are provided with suitable handles 17 for use in moving them to and from operative position.

The ring sections 12 and 15 are formed with registering recesses 18 and 19 respectively, spaced apart circumferentially of said ring sections and coacting in forming cavities in which to mould knobs 20 on the upper end of the article 10. Also, an inner corner of at least one of these ring sections is formed with a circumferential channel 21 which communicates with the moulding cavity 9 and with those jointly formed by the ring recesses 18 and 19. This channel serves to form an integral outwardly projecting rim flange 22 on the article 10, and the knobs 20 are integrally joined to said flange, thus providing a knobbed rim for said article.

The lower ring section 12 in Figures 1 and 2 is formed with sockets 23 into which to insert the mounting stems 24 of ornaments 25 to position and support these ornaments in the knob-moulding cavities formed by the registering recesses 18 and 19 independently of the top surface of the body 6 or other extraneous means, but Figure 5 illustrates that such ornament-mounting sockets may be formed in the upper ring section 15 if desired, as shown at 23'. Regardless of which ring section carries the ornaments, they will be embedded in and visible through the knobs 20 of the article 10, imparting a very attractive appearance to the rim of said article. The ornaments 25 may be of glass or other appropriate material and may be of any desired color or colors.

In practicing the invention with the aid of the mould disclosed, the stems 24 of the ornaments 25 are placed in the sockets of the ring section 12 or 15 while these sections are in separate relation and the plunger or mould section 8 occupies its elevated position. The parts are then relatively assembled to prepare the mould for reception of molten more or less transparent glass or the like and the article is moulded. In performing the moulding operation, the plunger or mould section 8 is of course lowered to press the glass or the like into all portions of the mould and to shape the inside of the article. After the moulding operation, the article is removed from the mould and the projecting portions of the ornament-mounting stems 24 are cut or ground off, leaving the article with the attractive appearance shown in Figure 4.

It is preferable to provide the mould body 6 with an ejecting plunger 26 to aid in removing the moulded article, said plunger having a head 27 to be given a light tap, when said body is inverted, to jar said article loose.

While preferences have been disclosed, attention is again invited to the possibility of making variations within the scope of the invention.

What is claimed as new, is:

1. An article mould comprising mould sections cooperable in providing a moulding cavity in which to mould a plastic, glass or like cup-like body and a continuous surrounding outstanding rim flange for the body, said sections including a recessed body section, a plunger in said recess spaced from the wall thereof to produce a surrounding space for forming the wall of the cup-like body and two superposed separable ring sections superposed on the body section around the recess therein with the lower ring section resting on the body section and having its inner wall forming a continuation of the wall of the body recess and the upper ring section extending in from said walls to fit the plunger and close the top of the space between the recess wall and the plunger, there being a surrounding outwardly extending continuous circumferential channel between the inner portion of the ring sections communicating with the top of the moulding cavity, said ring sections being formed with registering spaced coacting enlarged recesses around and communicating with said channel, one only of said ring sections having means for mounting ornaments in such positions that they will project inwardly from the surface of its enlarged recess for reception in enlargements formed in the coacting recesses of said ring sections on the surrounding edge of a rim flange formed in the circumferential channel on the rim of the cup-like body formed in the recessed body section between its recess wall and the plunger.

2. An article mould comprising mould sections cooperable in providing a moulding cavity in which to mould a plastic, glass or bowl-like receptacle body and a continuous surrounding outstanding rim flange for the body, said sections including a recessed body section, a plunger in said recess spaced from the wall thereof to produce a surrounding space for forming the wall of the bowl-like receptacle body and two superposed separable ring sections superposed on the body section around the recess therein with the lower ring section resting on the body section and having its inner wall forming a continuation of the wall of the body recess and the upper ring section extending in from said walls to fit the plunger and close the top of the space between the recess wall and the plunger, the lower ring section having an internal annularly recessed top edge forming a continuous annular circumferential channel surrounding and extending outwardly from the top of the body recess and communicating therewith to form a continuous outstanding rim flange on a bowl-like receptacle body formed in said body recess between the wall thereof and the plunger, said ring sections having coacting registering opposed concaved semispherical moulding recesses forming globular moulding cavities equidistantly spaced around and communicating with the channel cooperable in forming globular enlargements therein circumferentially around the channel and opposed annular contacting surfaces outwardly of said globular cavities cooperable with each other and the recessed top edge of the lower ring section cooperating with the inner annular surface portion of the top ring section to close the top of said body recess and define the top of the rim flange, at least one of said ring sections having sockets therethrough communicating with its semispherical recess and globular moulding cavities for snugly receiving the reduced stems formed on preformed ornaments having enlarged ornamental portions for mounting and holding the ornaments in positions to project into the globular moulding cavities to be embedded in the globular enlargements formed therein by forcing molten material from the body cavity by the plunger and into the annular channel and cavities, to form the bowl-like receptacle, rim flange and enlargements with the ornaments embedded therein on one piece.

ALBERT J. THROM.

REFERENCES CITED

The following references are of record in the file of this patent:

UNITED STATES PATENTS

| Number | Name | Date |
|---|---|---|
| 249,676 | Ripley | Nov. 15, 1881 |
| 261,644 | Vogeley | July 25, 1882 |
| 359,682 | Maxwell | Mar. 22, 1887 |
| 490,905 | Hanes | Jan. 31, 1893 |
| 1,153,126 | Long | Sept. 7, 1915 |
| 1,935,942 | Conner | Nov. 21, 1933 |
| 2,073,254 | Redman | Mar. 9, 1937 |
| 2,233,057 | Luce | Feb. 25, 1941 |
| 2,353,995 | Conner | July 18, 1944 |
| 2,451,913 | Brice | Oct. 19, 1948 |